United States Patent
Li et al.

(10) Patent No.: US 9,424,792 B2
(45) Date of Patent: Aug. 23, 2016

(54) TEST METHOD AND TEST DEVICE FOR LINE DEFECT OF DISPLAY PANEL

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Ming Li, Beijing (CN); Jongseok Jang, Beijing (CN); Yong Sub Kim, Beijing (CN); Xiaotao Liu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 145 days.

(21) Appl. No.: 14/389,031

(22) PCT Filed: Sep. 17, 2013

(86) PCT No.: PCT/CN2013/083600
§ 371 (c)(1),
(2) Date: Sep. 29, 2014

(87) PCT Pub. No.: WO2014/190639
PCT Pub. Date: Dec. 4, 2014

(65) Prior Publication Data
US 2016/0148587 A1    May 26, 2016

(30) Foreign Application Priority Data

May 30, 2013    (CN) .......................... 2013 1 0209644

(51) Int. Cl.
*G09G 5/00*    (2006.01)
*G09G 3/36*    (2006.01)
(Continued)

(52) U.S. Cl.
CPC .............. *G09G 3/3648* (2013.01); *G06T 7/001* (2013.01); *G09G 3/3677* (2013.01); *G06T 2207/30121* (2013.01); *G09G 2310/0202* (2013.01)

(58) Field of Classification Search
CPC .............. G09G 3/3648; G09G 3/3677; G09G 2310/0202; G06T 7/001; G06T 2207/30121
USPC .................... 324/760.01, 760.02; 345/87, 168
See application file for complete search history.

(56) References Cited

U.S. PATENT DOCUMENTS

| | | | | |
|---|---|---|---|---|
| 2006/0028414 A1* | 2/2006 | Kimura | ................... | G09G 3/006 345/87 |
| 2007/0018680 A1* | 1/2007 | Jeon | ....................... | G09G 3/006 324/750.3 |
| 2009/0294771 A1* | 12/2009 | Kim | ................... | G02F 1/136204 257/59 |

FOREIGN PATENT DOCUMENTS

| CN | 1746731 A | 3/2006 |
|---|---|---|
| CN | 1828396 A | 9/2006 |

(Continued)

OTHER PUBLICATIONS

International Search Report Appln. No. PCT/CN2013/083600; Dated Feb. 28, 2014.

(Continued)

*Primary Examiner* — Amit Chatly
(74) *Attorney, Agent, or Firm* — Ladas & Parry LLP

(57) ABSTRACT

A test method for line defect in a display panel (10) comprises: inputting a first ON signal and a first OFF signal into odd rows of gate scanning lines (GE12) and even rows of gate scanning lines (GS13) of the display panel (10) respectively, to turn on transistors controlled by the odd rows of gate scanning lines (GE12), and turn off transistors controlled by the even rows of gate scanning lines (GS13), thereby obtaining a first test image; inputting a second OFF signal and a second ON signal into the odd rows of gate scanning lines (GE12) and even rows of gate scanning lines (GS13) of the display panel (10) respectively, to turn off the transistors controlled by the odd rows of gate scanning lines (GE12), and turn on the transistors controlled by the even rows of gate scanning lines (GE13), thereby obtaining a second test image; comparing the first test image with the second test image to determine that line display defect appearing in the first test image or the second test image are true display defect. Also is disclosed a test device for line defect in a display panel (10). This method allows the test result to approach the lighting test result under module signal input state and can detect true defect of the display panel (10).

9 Claims, 5 Drawing Sheets

(51) Int. Cl.
*H01L 29/04* (2006.01)
*G06T 7/00* (2006.01)

(56) References Cited

FOREIGN PATENT DOCUMENTS

| CN | 102768815 A | 11/2012 |
|---|---|---|
| CN | 10327898 A | 9/2013 |
| CN | 103278948 A | 9/2013 |
| JP | 2003-231219 A | 8/2003 |
| JP | 2010-0169739 A | 8/2010 |

OTHER PUBLICATIONS

International Search Report & Written Opinion Appln. No. PCT/CN2013/083600; Dated Mar. 13, 2014.
First Chinese Office Action Appln. No. 201310209644.7; Dated Mar. 30, 2015.

\* cited by examiner

TEST METHOD AND TEST DEVICE FOR LINE DEFECT OF DISPLAY PANEL

TECHNICAL FIELD

Embodiments of the present invention relate to a test method and a test device for line defect of display panel.

BACKGROUND

In manufacturing process of liquid crystal display panels, testing for line defect of display panel is an indispensable processing step for ensuring display quality.

With more and more minimized products emerging and much higher precision of display panels, conventional test methods cannot meet the requirements on line defect inspection of display panels. Due to this demand, a test method of graph generator shorting has been proposed for line defect in a display panel by testing the graphic display of the display panel by inputting control signals into the display panel. Due to limitations of the test method of graph generator shorting, many line defects cannot be found, and a true line defect cannot be distinguished from a false line defect.

The test procedure of graph generator shorting test method is illustrated in FIG. 1, and FIG. 2 illustrates the display result of a display panel during the module signal inputting state. As can be seen from the comparison between FIGS. 1 and 2, the line-defect indicating line 1 in FIG. 1 disappears in FIG. 2, while the line-defect indicating lines 2 and 3 in FIG. 1 remain in FIG. 2, therefore the indicating line 1 in FIG. 1 indicates a false defect, and the indicating lines 2 and 3 indicate true defects. The reason why the true defect indicating lines 2 and 3 appear may involve broken wires in the display panel. The indicating line 1 occurs because: during the testing procedure of the graph generator shorting test method, the presence of static electricity (ESD) makes wires corresponding to the indicating line 1 become conductive, thereby giving rise to the line defects in the form as illustrated in FIG. 1. However, application of the traditional graph generator shorting test method is impossible to distinguish between the above-mentioned false and true defects.

SUMMARY

Embodiments of the present invention provide a test method and a test device for line defect of display panel, which allow the test result to approach more the lighting test result under module signal input state and can detect true defect of the display panel.

One aspect of the present invention provides a test method for line defect in a display panel comprising a plurality rows of gate lines and a plurality columns of data lines intersecting each other to thereby define pixel units arranged in an array, each pixel unit comprising a transistor serving as a switching element, switching state of the transistor being controlled by a corresponding gate line, the method comprising: inputting a first ON signal and a first OFF signal into odd rows of gate scanning lines and even rows of gate scanning lines of the display panel respectively, to turn on transistors controlled by the odd rows of gate scanning lines, and turn off transistors controlled by the even rows of gate scanning lines, thereby obtaining a first test image of the display panel; inputting a second OFF signal and a second ON signal into the odd rows of gate scanning lines and even rows of gate scanning lines of the display panel respectively, to turn off the transistors controlled by the odd rows of gate scanning lines, and turn on the transistors controlled by the even rows of gate scanning lines, thereby obtaining a second test image of the display panel; comparing the first test image with the second test image to determine that line display defects appearing in the first test image or the second test image are true display defects.

For example, the above-mentioned method may further comprises: inputting a third ON signal into both the odd rows of gate scanning lines and even rows of gate scanning lines of the display panel, to turn on the transistors controlled by both the odd rows and the even rows of gate scanning lines, thereby obtaining a third test image of the display panel; comparing the first test image and the second test image with the third test image to determine that line display defects appearing in the third test image but not in the first test image and the second test image are false display defects.

For example, in the above-mentioned method, the first ON signal and the second ON signal are same; the first OFF signal and the second OFF signal are same.

For example, in the above-mentioned method, all of the first ON signal, the second ON signal and the third ON signal are same.

For example, in the above-mentioned method, the first ON signal, the second ON signal and/or the third ON signal are high level signals, and the first OFF signal and/or the second OFF signal are low level signals.

For example, in the above-mentioned method, the first ON signal, the second ON signal and/or the third ON signal are alternate current signals or direct current signals, and the first OFF signal and/or the second OFF signal are direct current signals.

For example, in the above-mentioned method, when the first ON signal, the second ON signal and/or the third ON signal are direct current signals, magnitude range of voltages is from 15 voltage to 28 voltage; when the first OFF signal and/or the second OFF signal are direct current signals, magnitude range of voltages is from −10 voltage to −6 voltage.

For example, in the above-mentioned method, the first ON signal, the second ON signal and/or the third ON signal are direct current signals of 21.5 V or alternate current signals of −7.8 V to 21.5 V; and the first OFF signal and/or the second OFF signal are direct current signals of −7.8 V.

Another aspect of the present invention further provides a test device for the above-mentioned method, the test device comprising: a signal output unit configured to input a first ON signal and a first OFF signal into odd rows of gate scanning lines and even rows of gate scanning lines of the display panel in the first stage to turn on transistors controlled by the odd rows of gate scanning lines and turn off transistors controlled by the even rows of gate scanning lines, thereby obtaining a first test image of the display panel; and input a second OFF signal and a second ON signal into odd rows of gate scanning lines and even rows of gate scanning lines of the display panel in the second stage to turn off the transistors controlled by the odd rows of gate scanning lines and turn on the transistors controlled by the even rows of gate scanning lines, thereby obtaining a second test image of the display panel; a determination unit configured to judge a line display defect in the first test image and the second test image to determine that the line display defect appearing in the first test image or the second test image is a true display defect. A result output unit configured to output a determination result of the determination unit.

For example, in the above-mentioned test device, the signal output unit may be further configured to input a third ON signal into both the odd rows of gate scanning lines and the even rows of gate scanning lines of the display panel in a third stage, to turn on transistors controlled by the both the odd rows and even rows of gate scanning lines, thereby obtaining a third test image of the display panel.

For example, in the above-mentioned test device, the determination unit may be further configured to compare the third test image, the first test image and the second test image to determine that line display defects appearing in the third test image but not in the first test image and the second test image are false display defects.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
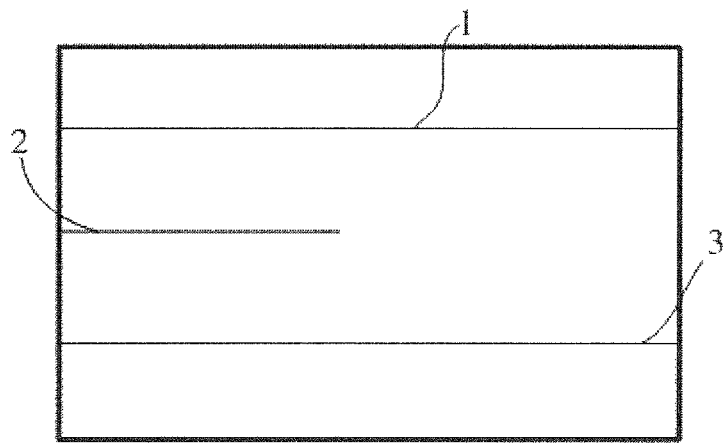
FIG. 1 shows test results of a display panel in conventional line defect testing.

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. The terms such as "a," "an," etc., are not intended to limit the amount, but indicate the existence of at lease one. "A and/or B" means either or both of A and B. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On," "under," "right," "left" and the like are only used to indicate relative position relationship, and when the position of the object which is described is changed, the relative position relationship may be changed accordingly.

The display panel according to embodiments of the present invention comprises a plurality of rows of gate lines and a plurality of columns of data lines intersecting each other to thereby define pixel units arranged in an array. For example, each pixel unit comprises a thin film transistor functioning as a switching element, and a pixel electrode and a common electrode for controlling orientation of liquid crystal. For example, of the thin film transistor of each pixel, the gate is electrically connected with or faulted integrally with a corresponding gate line, the source is electrically connected with or formed integrally with a corresponding data line, and the drain is electrically connected with or formed integrally with a corresponding pixel electrode.

One embodiment of the present invention provides a test method for line defect in a display panel comprising a plurality rows of gate lines and a plurality columns of data lines intersecting each other to thereby define pixel units arranged in an array, each pixel unit comprising a transistor serving as a switching element, and the switching of these transistors is controlled by corresponding gate lines. The test method comprises steps of:

Step S310, inputting a first ON signal and a first OFF signal into the odd rows of gate scanning lines (namely odd rows of gate lines) and even rows of gate scanning lines (namely even rows of gate lines) of the display panel respectively, to turn on transistors controlled by the odd rows of gate scanning lines, and turn off transistors controlled by the even rows of gate scanning lines, thereby obtaining a first test image of the display panel;

Step S320, inputting a second OFF signal and a second ON signal into the odd rows of gate scanning lines and even rows of gate scanning lines of the display panel respectively, to turn off the transistors controlled by the odd rows of gate scanning lines, and turn on the transistors controlled by the even rows of gate scanning lines, thereby obtaining a second test image of the display panel;

S330, comparing the first test image with the second test image to determine that a line display defect appearing in the first test image or the second test image is a true display defect.

With the method of the present embodiment, test images are obtained by separately turning on odd rows of gate scanning lines and even rows of gate scanning lines by separately inputting on signals into odd rows of gate scanning lines and even rows of gate scanning lines, to thereby determine whether there is any display defect in the display panel. That is, with the above-mentioned steps S310 and S320 in the present embodiment, two different test images are obtained by turning on, in turn, the transistors controlled by the odd rows of gate scanning lines and the even rows of gate scanning lines respectively. When applying the traditional test methods illustrated in FIGS. 1 and 2, the same control signal is input into both odd rows of gate scanning lines and even rows of gate scanning lines at the same time, making it impossible to uncover short circuits between adjacent gate lines even there is any. That is, such instances exist in which a true defect resulted from shorting between lines cannot be presented normally. The method of the present embodiment can avoid such instances.

Figure 2:
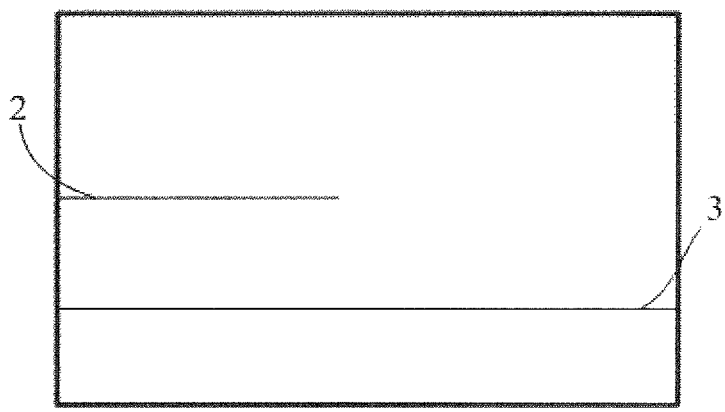
FIG. 2 shows a display result of the same display panel as that illustrated in FIG. 1 in the module control signal input state.

Also, in the traditional test method illustrated in FIGS. 1 and 2, there exist false display defect lines because of static electricity. While for the method of the present embodiment, such case can be avoided since adjacent gate scanning lines are not turned on at the same time, and it is possible to definitely find out a true display defect of the display panel.

Preferably, another embodiment of the present invention further provides a method comprising the following steps in addition to steps S310 and S330 of the above-mentioned embodiments.

Step S340, inputting a third ON signal into both the odd rows of gate scanning lines and even rows of gate scanning lines of the display panel, to turn on the transistors controlled by the odd rows and even rows of gate scanning lines respectively, thereby obtaining a third test image of the display panel;

S350, comparing the first test image and the second test image with the third test image to determine that the line display defects appearing in the third test image but not in the first test image or the second test image are false display defects.

For example, the first ON signal input for obtaining the first test image is the same as the second ON signal input for obtaining the second test image; and the first OFF signal input for obtaining the first test image is the same as the second OFF signal input for obtaining the second test image.

For example, the above-mentioned first ON signal, second ON signal and third ON signal are the same as one another.

With the above-mentioned test method, the third test image obtained in step S340 is the test result obtained by a traditional shorting test method, wherein there may be a false display defect in the third test image; and the first test image and the second test image which are complementary images to each other are obtained by steps S310 and S320. Under normal conditions, that is, in case all lines displayed in the third test image correspond to true display defects, the combination of lines displayed in the first and second test images should correspond to those in the third test image.

However, with steps S310 and S320 in the above-mentioned embodiments, odd rows of gate scanning lines and even rows of gate scanning lines are turned on, in turn, to obtain two different test images, which can avoid the following instances: when obtaining the third test image, same control signals are input into odd rows of gate scanning lines and even rows of gate scanning lines at the same time, with equal voltages applied to both the odd and even rows, short circuits between lines is undetectable and a true display defect cannot be presented normally. Also, with the method of the present embodiment, since adjacent gate scanning lines are not turned on at the same time, it is also possible to avoid instances: in the traditional test methods, false display defect lines exist due to static electricity.

Therefore, by comparing the first test image and the second test image with the third test image, it is possible to determine false and true defect display lines on the display panel. With the test method described in embodiments of the present invention, it is possible to make test results more close to test results in lighting test in a module signal input state and to distinguish between false and true defects.

Furthermore, for example, the above-mentioned first ON signal, second ON signal and/or third ON signal are high level signals, and the first OFF signal and/or second OFF signal are low level signals.

Furthermore, for example, the above-mentioned first ON signal, second ON signal and/or third ON signal are alternate current signals or direct current signals, and the first OFF signal and/or second OFF signal are direct current signals.

For example, when the first ON signal, the second ON signal and/or the third ON signal are direct current signals, the magnitude range of signal voltages may be from 15 volt to 28 volt; when the first OFF signal and/or the second OFF signal are direct current signals, the magnitude range of signal voltages may be from −10 volt to −6 volt. In such ranges, the transistors controlled by odd rows of gate scanning lines and even rows of gate scanning lines can be turned on and off better, resulting in better test results and improved test precision.

For example, the first ON signal, the second ON signal and/or the third ON signal are direct current signals of 21.5 V or alternate current signals of −7.8 V to 21.5 V; the first OFF signal and/or the second OFF signal are direct current signals of −7.8 V. In this case, the gates of transistors of respective gate lines can be completely turned on or off, hence improving test results.

Hereinafter, the test principle of the test method of the present invention when the above-mentioned input modes for signals are used will be described in detail with reference to FIGS. 3 to 7.

Figure 3:
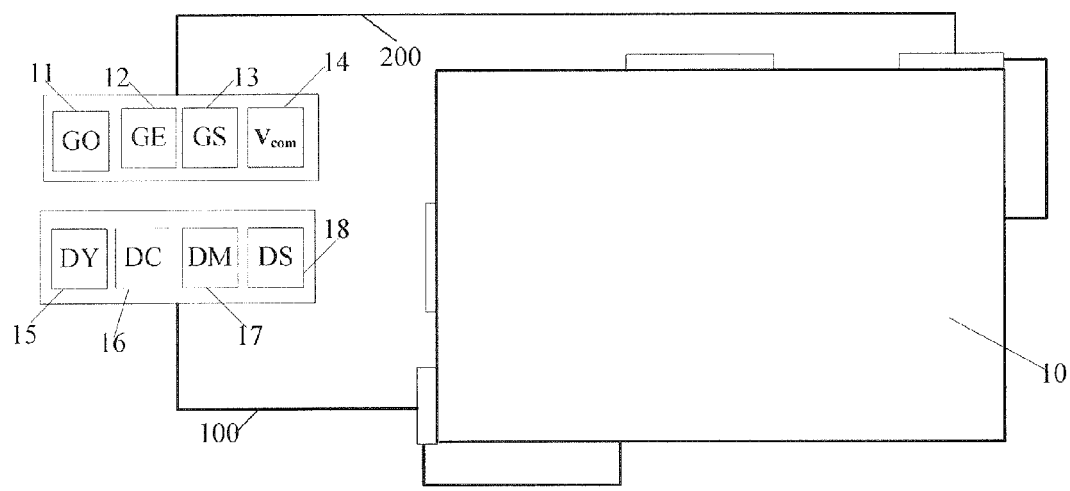
FIG. 3 shows a structure diagram of the test electrodes of a display panel.
Figure 4:
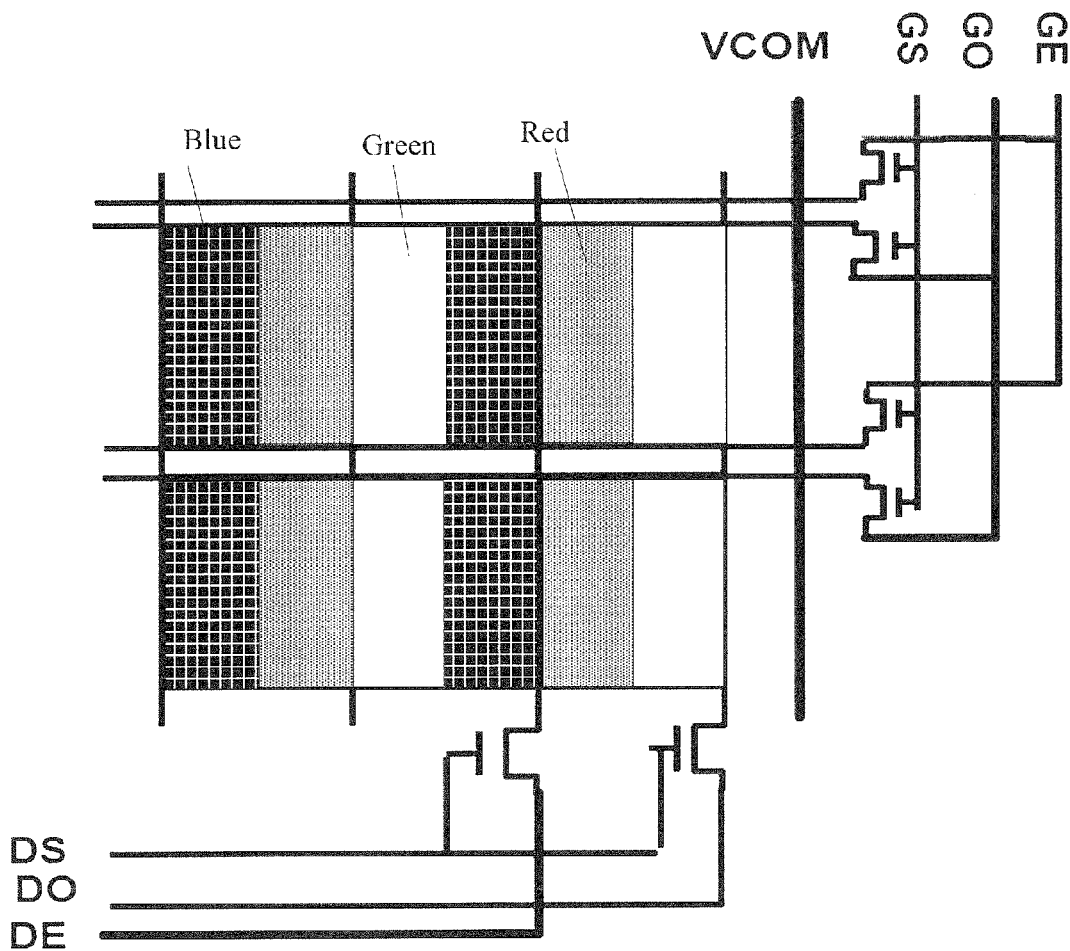
FIG. 4 shows a structural diagram of the test principle of a display panel.

With reference to the structure diagram of the test electrodes on the display panel as illustrated in FIG. 3 and the diagram of the test circuit as illustrated in FIG. 4, the test input signals applied to the display panel 10 comprise: data signal Data 100, gate scanning line signal Gate 200, common voltage signal Vcom, DS (source data switch) and GS (gate scanning line signal switch). The control terminals on the display panel 10 are indicated with even rows of gate scanning lines GO11, odd rows of gate scanning lines GE12, gate scanning line switch GS13, common voltage Vcom 14, yellow data signal DY 15, cyan data signal DC 16, magenta data signal DM 17, and data line switch DS 18 respectively.

Ports related to data lines mainly control gray scales of the display panel and On/Off states of the data lines. The test input terminals, i.e., common power supply Vcom 14, yellow data signal DY 15, cyan data signal DC 16, magenta data signal DM 17 and data line switch DS 18 cannot be varied during the test process. Further, input signal applied over the common power supply Vcom 14 cannot be modified either. Therefore, it is possible to determine a true display defect by only modifying signal input modes on even rows of gate scanning lines GO 11 and odd rows of gate scanning lines GE 12.

Generally, when a signal supply test is conducted by means of shorting test method with the circuit structure as illustrated in FIGS. 3 and 4, DC or AC voltages from 0 to 8 V are input to data line input terminals (comprising yellow data signal DY 15, cyan data signal DC 16 and magenta data signal DM 17). The common voltage Vcom 14 is set to 3.2 to 4.2 V, while an AC voltage alternating between −7.8 V to 21.5 V is input into even rows of gate scanning lines GO 11 and odd rows of gate scanning lines GE 12 respectively.

That is, in the illustrated step S340, when the third ON signal is input into odd rows of gate scanning lines and even rows of gate scanning lines respectively of the display panel to be tested, to turn on both odd rows of gate scanning lines and even rows of gate scanning lines, thereby obtaining the third test image of the display panel to be tested, the input third ON signal is an AC signal alternated between a first voltage and a second voltage. In general, the first voltage is 21.5 V, and the second voltage is −7.8 V.

With the test method described in embodiments of the present invention, the signal input mode in steps S310 and S320 for separately turning on the transistors controlled by even rows of gate scanning lines GO 11 and odd rows of gate scanning lines GE 12 for testing, thereby obtaining the first test image and the second test image which are complementary images to each other, comprises: when a first ON signal is input into odd rows of gate scanning lines GE 12, a first OFF signal is input into even rows of gate scanning lines GO 11, the first test image is obtained; and when a second OFF signal is input into odd rows of gate scanning lines GE 12 and a second ON signal is input into even rows of gate scanning lines GO 11, the second test image is obtained.

Since the first ON signal may be the same as the second ON signal and the first OFF signal may be the same as the second OFF signal, the first OFF signal and the first ON signal may be input alternately on even rows of gate scanning lines GO 11 and odd rows of gate scanning lines GE 12 to separately turn on even rows of gate scanning lines GO 11 and odd rows of gate scanning lines GE 12 for detecting a true line display defect in the display panel.

In the present embodiment, there are two modes for separately turning on the transistors controlled by even rows of gate scanning lines GO 11 and odd rows of gate scanning lines GE 12.

The first mode: the first ON signal and the second ON signal are the same, i.e., AC signal of −7.8 V to 21.5 V; and the first OFF signal and the second OFF signal are the same, i.e., DC signal of −7.8 V.

The second mode: the first ON signal and the second ON signal are the same, i.e., DC signal of 21.5 V; and the first OFF signal and the second OFF signal are the same, i.e., DC signal of −7.8 V.

Figure 5:
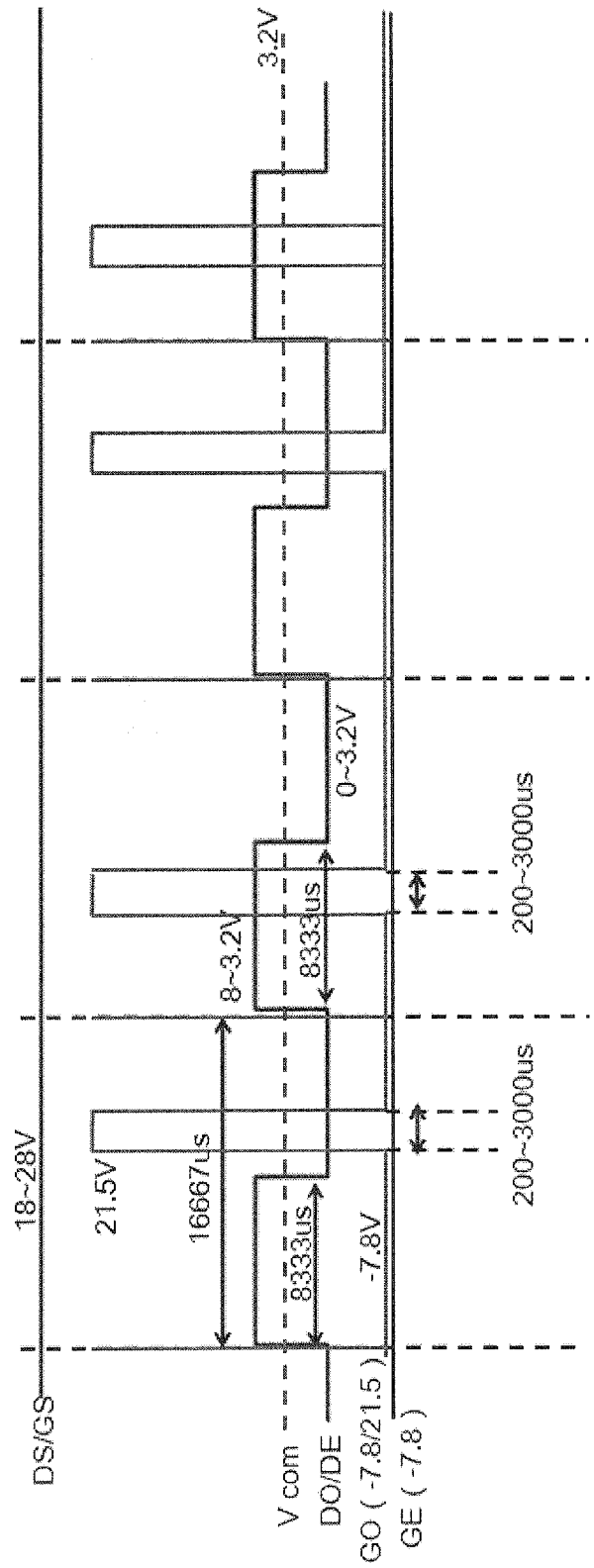
FIG. 5 shows a timing sequence diagram of a first test signal input mode.

The timing control diagram for the first input mode to realize the second test image is illustrated in FIG. 5 in which an AC voltage alternating between −7.8 V to 21.5 V is input into the even rows of gate scanning lines GO 11, and a DC voltage of −7.8 V is input into the odd rows of gate scanning lines GE 12 so as to turn on the transistors controlled by even rows of gate scanning lines GO 11 and turn off the transistors controlled by the odd rows of gate scanning lines GE 12, thereby obtaining the second test image. In this input mode, control signals input into the even rows of gate scanning lines GO 11 and the odd rows of gate scanning lines GE 12 are exchanged, that is, an AC voltage alternating between −7.8 V to 21.5 V is input into the odd rows of gate scanning lines GE 12, and a DC voltage of −7.8 V is input into the even rows of gate scanning lines GO 11, such that the odd rows of gate scanning lines GE 12 are turned on, and the even rows of gate scanning lines 11 are turned off, thereby obtaining the first test image.

With the above-mentioned first mode, after obtaining the first test image and the second test image, it is possible to detect a true display defect of the display panel. The work principle is as follows.

Generally, reasons for a display panel to form a true line display defect involve the following two: one is related to broken gate scanning line, and the other is related to shorting between adjacent gate scanning lines. With the modes of embodiments of the present invention, if a gate scanning line is broken in the display panel, the transistors controlled by the odd rows of gate scanning lines GE and the even rows of gate scanning lines GO are turned on separately to obtain the first test image and the second test image. Depending on the position of open-circuit in the gate scanning line, defective display line due to open gate scanning line can be displayed in one of the first test image and the second test image. If adjacent gate scanning lines are shorted in the display panel, the transistors controlled by the odd rows of gate scanning lines GE and the even rows of gate scanning lines GO are turned on respectively, and the equivalent direct currents for the even rows of gate scanning lines GO and the odd rows of gate scanning lines GE are different from each other, causing a high level signal flow to the low level gate scanning line via the short point and hence forming a weak display line. Therefore, this may be detected by turning on the transistors controlled by the odd rows of gate scanning lines and the even rows of gate scanning lines respectively to obtain two test images.

Therefore, with embodiments of the present invention, after obtaining the above-mentioned first test image and the second test image, it is possible to determine whether the line display defect appearing in the first test image or the second test image is a true line display defect.

With the above-mentioned approach, the following instances will not occur in which, in testing by the approach of obtaining the third test image, the same control signal is input into the even rows of gate scanning lines GO and the odd rows of gate scanning lines GE, thus equal voltages occurs over the odd and even rows, causing shorting between lines unable to be displayed, and therefore the shorting defect between gate scanning lines cannot be detected normally.

In addition, preferably, another embodiment of the present invention further obtains the third test image in a normal test approach. By comparing the third test image with the first and second test images, it is possible to determine the types of true line display defects appearing in the first test image or the second test image. If a defective display line appearing in the first test image or the second test image does not appear in the third test image, it is possible to determine that the defective display line is caused by the shorting between gate scanning lines.

Figure 7:
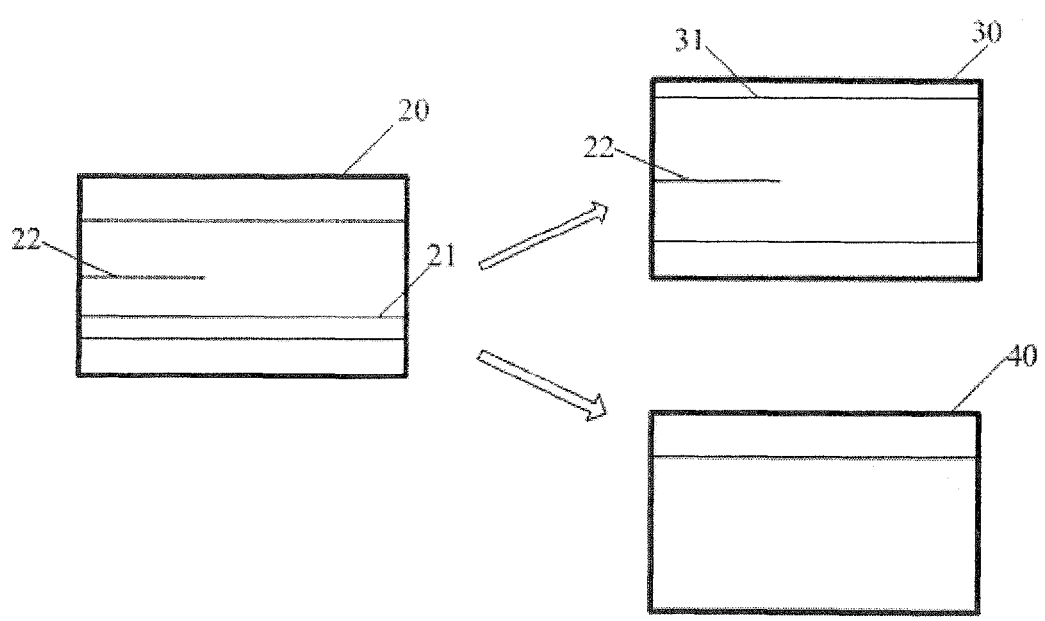
FIG. 7 is a diagram showing results of a first test image, a second test image and a third test image.

As an example, the test results in applying the above-mentioned test signal input mode are illustrated in FIG. 7 in which 20, 30 and 40 denote graphs displayed in the third test image, the first test image and the second test image respectively. By comparing the first test image and the second test image with the third test image, it can be understood that the weak line 31 in the image 30 does not appear in the image 20, therefore it is determined that this weak line 31 is a true display defect caused by line shorting.

Figure 6:
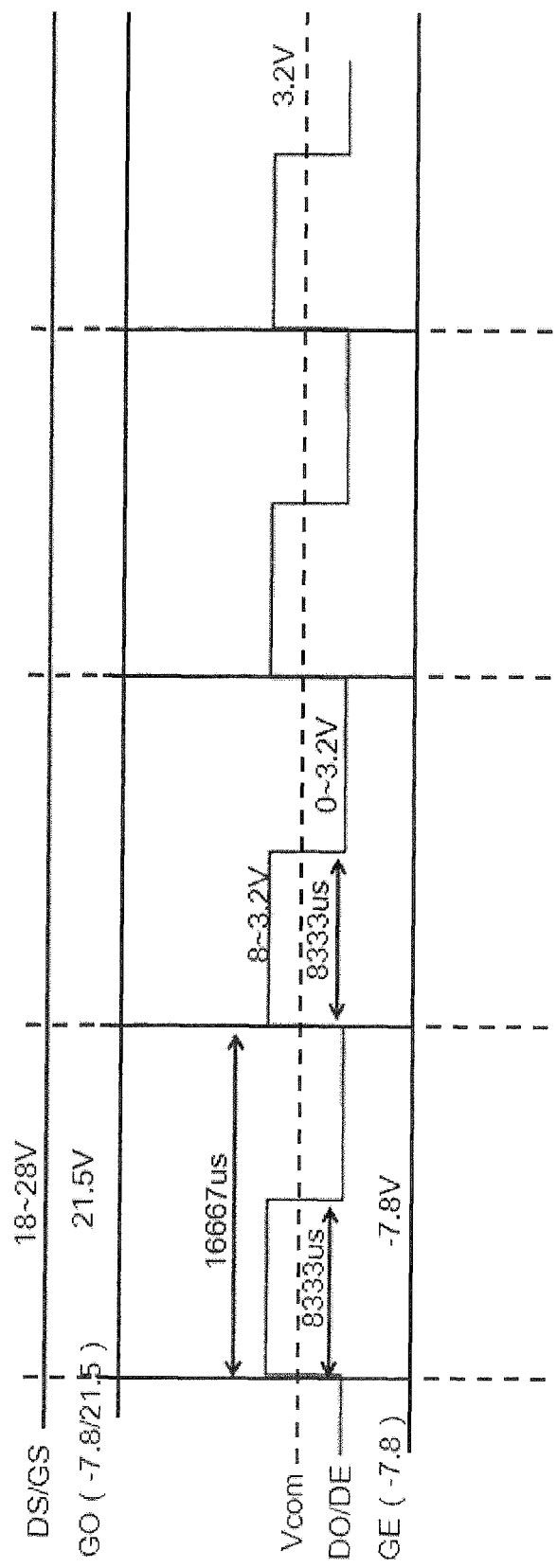
FIG. 6 shows a timing sequence diagram of a second test signal input mode.

The timing control diagram for the second input mode to realize the second test image is illustrated in FIG. 6 in which an DC voltage of 21.5 V is input into the even rows of gate scanning lines GO 11, and a DC voltage of −7.8 V is input into the odd rows of gate scanning lines GE 12 so as to turn on the even rows of gate scanning lines GO 11 and turn off the odd rows of gate scanning lines GE 12, thereby obtaining the second test image. With this input mode, control signals input into the even rows of gate scanning lines GO 11 and the odd rows of gate scanning lines GE 12 are exchanged, that is, an DC of 21.5 V is input into the odd rows of gate scanning lines GE 12, and a DC voltage of −7.8 V is input into the even rows of gate scanning lines GO 11, such that the odd rows of gate scanning lines GE 12 are turned on, and the even rows of gate scanning lines 11 are turned off, thereby obtaining the first test image.

Further, an AC signal ranging from −7.8 V to 21.5 V is input into both the odd rows and the even rows of gate scanning lines to obtain a third test image. It is possible to find out the false display defect caused by static electricity by comparing the first test image and the second test image with the third test image. The work principle is as follows.

In applying the conventional test approach, namely the third test image is obtained for detection, both even rows of gate scanning lines GO 11 and odd rows of gate scanning lines GE 12 are turned on; in this state adjacent two gate scanning lines may be brought to a lightly conducting state due to electrostatic interaction, and then the voltages on two adjacent gate scanning lines will be superposed. The two gate scanning lines with static electricity will exhibit two brighter or darker display lines than other rows, hence appearing as defective display but presenting false display defect. In applying embodiments of the present invention, the first test image and the second test image are obtained by turning on the odd rows of gate scanning lines and the even rows of gate scanning lines separately. Since the odd rows of gate scanning lines and the even rows of gate scanning lines are not turned on at the same time, the superimposed effect between two adjacent gate scanning lines is weak and negligible, and then no defective display line will occur in the first test image and the second test image.

Therefore, the first test image and the second test image are compared with the third test image obtained in step S340; under normal conditions, that is, if all lines displayed in the third test image are related to true display defects, the combination of the lines displayed in the first and second test images should correspond to those of the third test image. However, if there is any false display defect in the third test image, the false display defect line will not appear in the first test image and the second test image. Thus, a display line existing in the third test image but not in the first test image and the second test image can be determined as a false display defect. The display line existing both in the third test image and in the first test image or the second test image can be determined as a true display defect.

As an example, the test results as applying the above-mentioned test signal input mode are illustrated in FIG. 7 in which the reference numbers 20, 30 and 40 denote graphs displayed in the third test image, the first test image and the second test image respectively. By comparing the first test image and the second test image with the third test image, it can be seen that the line 21 in the image 20 is not displayed in neither the image 30 nor the image 40, and it is determined this line 21 is a false display defect. The line 22 in the image 20 appears in the image 30, and it is determined this line 22 is a true display defect.

Another embodiment of the present invention further provides a test device for the above-mentioned test method, comprising a signal output unit, a determination unit and a result output unit.

The signal output unit is configured to input a first ON signal and a first OFF signal into the odd rows of gate scanning lines and the even rows of gate scanning lines of the display panel in the first stage to turn on the transistors controlled by the odd rows of gate scanning lines and turn off the transistors controlled by the even rows of gate scanning lines, thereby obtaining the first test image of the display panel; and input a second OFF signal and a second ON signal into the odd rows of gate scanning lines and the even rows of gate scanning lines of the display panel in the second stage to turn off the transistors controlled by the odd rows of gate scanning lines and turn on the transistors controlled by the even rows of gate scanning lines, thereby obtaining the second test image of the display panel.

The determination unit is configured to judge a line display defect in the first test image and the second test image to determine that the line display defect appearing in the first test image or the second test image is a true display defect or not.

The result output unit is configured to output the determination result of the determination unit.

For example, the signal output unit may also be configured to input a third ON signal into both the odd rows of gate scanning lines and the even rows of gate scanning lines of the display panel in the third stage, to turn on the transistors controlled by the odd rows and the even rows of gate scanning lines, thereby obtaining the third test image of the display panel.

Furthermore, the determination unit may also be configured to compare the first test image and the second test image with the third test image to determine that the line display defect appearing in the third test image but not in the first test image and the second test image is a false display defect.

The signal output unit, the determination unit and the result output unit may be implemented by common dedicated circuits or universal circuits such as processors (CPU, DSP) or implemented at least part by software and/or firmware, which is not described in detail here.

For example, the first ON signal and the second ON signal are the same; and the first OFF signal and the second OFF signal are the same. For example, all of the first ON signal, the second ON signal and the third ON signal are the same.

Furthermore, for example, the first ON signal, second ON signal and/or third ON signal are high level signals, and the first OFF signal and/or second OFF signal are low level signals.

Furthermore, for example, the first ON signal, second ON signal and/or third ON signal are AC signals or DC signals, and the first OFF signal and/or second OFF signal are DC signals.

For example, when the first ON signal, the second ON signal and/or the third ON signal are direct current signals, the magnitude range of voltages may be from 15 voltage to 28 voltage; when the first OFF signal and/or the second OFF signal are direct current signals, magnitude range of voltages may be from −10 voltage to −6 voltage.

For example, the first ON signal, the second ON signal and/or the third ON signal are direct current signals of 21.5 V or alternate current signals of −7.8 V to 21.5 V; the first OFF signal and/or the second OFF signal are direct current signals of −7.8 V.

With the test method and the test device according to the embodiments of the present invention, it is possible to make test results more close to the test results in the lighting under module signal input state and recognize between false and true defects.

What are described above is related to the illustrative embodiments of the disclosure only and not limitative to the scope of the disclosure; the scopes of the disclosure are defined by the accompanying claims.

The invention claimed is:

1. A test method for line defect in a display panel comprising a plurality rows of gate lines and a plurality columns of data lines intersecting each other to thereby define pixel units arranged in an array, each pixel unit comprising a transistor serving as a switching element, switching state of the transistor being controlled by a corresponding gate line, the method comprising:

inputting a first ON signal and a first OFF signal into odd rows of gate scanning lines and even rows of gate scanning lines of the display panel respectively, to turn on transistors controlled by the odd rows of gate scanning lines, and turn off transistors controlled by the even rows of gate scanning lines, thereby obtaining a first test image of the display panel;

inputting a second OFF signal and a second ON signal into the odd rows of gate scanning lines and the even rows of gate scanning lines of the display panel respectively, to turn off the transistors controlled by the odd rows of gate scanning lines, and turn on the transistors controlled by the even rows of gate scanning lines, thereby obtaining a second test image of the display panel; and comparing the first test image with the second test image to determine that line display defect appearing in the first test image or the second test image is true display defect;

wherein the method further comprises:
inputting a third ON signal into both the odd rows of gate scanning lines and the even rows of gate scanning lines of the display panel to turn on the transistors controlled by both the odd rows and the even rows of gate scanning lines, thereby obtaining a third test image of the display panel;
comparing the first test image and the second test image with the third test image to determine that line display defects appearing in the third test image but not in the first test image and the second test image are false display defects.

2. The method of claim 1, wherein the first ON signal and the second ON signal are same; and the first OFF signal and the second OFF signal are same.

3. The method of claim 1, wherein all of the first ON signal, the second ON signal and the third ON signal are same.

4. The method of claim 1, wherein the first ON signal, the second ON signal and/or the third ON signal are high level signals, and the first OFF signal and/or the second OFF signal are low level signals.

5. The method of claim 1, wherein the first ON signal, the second ON signal and/or the third ON signal are alternate current signals or direct current signals, and the first OFF signal and/or the second OFF signal are direct current signals.

6. The method of claim 5, wherein when the first ON signal, the second ON signal and/or the third ON signal are direct current signals, a magnitude range of voltages is from 15 voltage to 28 voltage; when the first OFF signal and/or the second OFF signal are direct current signals, a magnitude range of voltages is from −10 voltage to −6 voltage.

7. The method of claim 5, wherein the first ON signal, the second ON signal and/or the third ON signal are direct current signals of 21.5 V or alternate current signals of −7.8 V to 21.5 V; and the first OFF signal and/or the second OFF signal are direct current signals of −7.8 V.

8. A test device for the method of claim 1, comprising:
a signal output unit configured to input a first ON signal and a first OFF signal into odd rows of gate scanning lines and even rows of gate scanning lines of a display panel in a first stage to turn on transistors controlled by the odd rows of gate scanning lines and turn off the transistors controlled by the even rows of gate scanning lines, thereby obtaining a first test image of the display panel; and input a second OFF signal and a second ON signal into the odd rows of gate scanning lines and the even rows of gate scanning lines of the display panel in a second stage to turn off the transistors controlled by the odd rows of gate scanning lines and turn on the transistors controlled by the even rows of gate scanning lines, thereby obtaining a second test image of the display panel;
a determination unit configured to judge a line display defect in the first test image and the second test image to determine that the line display defect appearing in the first test image or the second test image is a true display defect; and
a result output unit configured to output a determination result of the determination unit;
wherein the single output unit is further configured to input a third ON signal into both the odd rows of gate scanning lines and the even rows of gate scanning lines of the display panel in a third stage, to turn on the transistors controlled by the both the odd rows and the even rows of gate scanning lines, thereby obtaining a third test image of the display panel.

9. The test device of claim 8, wherein the determination unit is further configured to compare the third test image with the first test image and the second test image to determine that line display defects appearing in the third test image but not in the first test image and the second test image are false display defects.

* * * * *